United States Patent
Berndt et al.

(10) Patent No.: US 6,355,134 B1
(45) Date of Patent: Mar. 12, 2002

(54) METHOD OF JOINING TWO OR MORE PARTS

(75) Inventors: Manfred Berndt, Waldbronn; Werner Karl Schomburg, Pfinztal; Zeno Rummler, Eggenstein-Leopeoldshafen; Ralf-Peter Peters, Bergisch-Gladbach; Mario Hempel, Dortmund, all of (DE)

(73) Assignee: Agilent Technologies, Inc., Loveland, CO (US)

( * ) Notice: Subject to any disclaimer, the term of this patent is extended or adjusted under 35 U.S.C. 154(b) by 0 days.

(21) Appl. No.: 09/353,868

(22) Filed: Jul. 15, 1999

(30) Foreign Application Priority Data

Jul. 17, 1998 (EP) .............................. 98113376

(51) Int. Cl.[7] ................................. C09J 7/00
(52) U.S. Cl. ................. 156/311; 156/313; 156/494; 95/156; 210/323.1
(58) Field of Search ............... 156/157, 290, 156/292, 311, 313, 494, 106; 261/DIG. 19; 95/156, 214; 210/321.75, 321.64, 323.1

(56) References Cited

U.S. PATENT DOCUMENTS

| | | | |
|---|---|---|---|
| 3,619,323 A | 11/1971 | Stebleton | |
| 3,883,383 A * | 5/1975 | Leitz | 156/242 |
| 4,152,188 A * | 5/1979 | Friedrich et al. | 156/212 |
| 4,165,248 A * | 8/1979 | Darlington et al. | 156/308 |
| 4,211,594 A * | 7/1980 | Freitag et al. | 156/158 |
| 4,238,207 A | 12/1980 | Ruschke | |
| 4,804,565 A | 2/1989 | Rast | |
| 5,364,597 A | 11/1994 | Polk, Jr. et al. | |
| 5,593,532 A * | 1/1997 | Falk et al. | 156/285 |
| 5,798,187 A * | 8/1998 | Wilson et al. | 4298/26 |

OTHER PUBLICATIONS

European Search Report, EP 98 11 3376, Dec. 21, 1998.

* cited by examiner

Primary Examiner—Jeff H. Aftergut
Assistant Examiner—Jessica Rossi

(57) ABSTRACT

In a method for joining two or more solid parts, a foil is provided between the two parts, the foil is heated to an elevated temperature by means of a thermode such that it becomes soft, and then the foil is cooled down below the elevated temperature, thus providing a permanent connection. The method can be used for bonding a gas-permeable membrane to a housing such as to produce a liquid chromatography degasser. The bonding method ensures that no unwanted substances are released when liquid comes into contact with the bonding region.

12 Claims, 2 Drawing Sheets

METHOD OF JOINING TWO OR MORE PARTS

The invention relates to a method for joining two or more parts. Such a method can be used, for example, in the manufacture of a degasser for a liquid chromatograph for joining a gas-permeable membrane to a body receiving the liquid to be degassed.

BACKGROUND OF THE INVENTION

In liquid chromatography, degassers are used to reduce the amount of gas dissolved in the solvents used. The solvents used in liquid chromatography are usually stored in contact with the surrounding air so that they are usually in a gas-saturated state. These dissolved gases adversely affect the chromatographic measurements.

U.S. Pat. No. 4,469,495 describes a liquid chromatography degasser for removing oxygen or other dissolved gases from a liquid used in liquid chromatography, wherein the liquid being degassed is passed through a spiral-shaped tube. This tube is made of a synthetic resin material, such as tetrafluoroethylene. U.S. Pat. No. 4,729,773 describes a device for degassing liquids in which the liquid is passed through a tube made of a fluor-resin which allows gases to pass through it while preventing the liquid from doing so. Degassers using flat membranes are known from U.S. Pat. No. 3,751,879 and from U.S. Pat. No. 3,735,562. Another degasser using a membrane is known from EP 718016.

Degassers using membranes typically comprise a cavity formed in a housing, through which the liquid to be degassed flows. On the side of the membrane distal from the cavity, vacuum is applied, thus forcing gases dissolved in the liquid through the membrane to the outside. The membrane has to be attached to the housing such that liquid cannot leak from the cavity to the outside through the connection between the membrane and the housing. A typical, cost-efficient method for joining the membrane and the housing is glueing.

Glueing, however, has several disadvantages. First, the glue or bonding agent may be dissolved by certain solvents used in chromatography, thus leading to leaks or complete destruction of the connection. Second, the glueing material may release unwanted substances which may be transported by the solvent stream in a liquid chromatograph to the detector where they interfere with the detection of the sample substances.

The problems mentioned in connection with a degasser can also occur with other parts in a liquid chromatograph which comprise a connection of two parts which come into contact with liquid, for example with solvent.

SUMMARY OF THE INVENTION

In view of the prior art, it is an object of the invention to provide a method for permanently joining solid parts in such a way that the region where the two parts are joined does not release unwanted substances when liquid comes into contact with said region, nor that the connection gets loose.

It is another object of the invention to provide a method for joining solid parts in a component of a liquid chromatograph which comes into contact with liquids.

It is a further object to provide such a method for manufacturing a liquid chromatography degasser.

It is a still further object to provide a method for joining solid parts which is cost efficient.

According to the present invention, these objects are achieved by a method comprising the following steps:

a) providing a foil between the two parts;
b) heating said foil to an elevated temperature such that it becomes soft;
c) providing a cooling step for cooling down the foil below the elevated temperature of step b).

The foil arranged between the two parts which are to be joined acts as a welding foil which is heated and then, after cooling down, provides for a permanent connection between the two parts. Preferably, the foil is locally heated to a temperature above the melting point. Preferably, at least one of the parts to be joined is prevented from thermal expansion during application of heat, for example by using a framing member surrounding the part.

According to an embodiment of the invention, one of the two joining partners is a thin membrane which may be as thin as 10 micrometers or thinner. This is particularly useful for manufacturing a liquid chromatography degasser comprising a thin gas-permeable membrane. A degasser which is preferably manufactured according to the method of the present invention is described in a co-pending European patent application entitled "Apparatus for Degassing Liquids", filed on the same date and by the same applicant as the present application. The membrane can be made of a fluorinated synthetic material. In an embodiment of the invention, the membrane is stretched across a frame and then placed on the foil by corresponding movement of the frame. The frame may also provide the function of preventing thermal expansion of the body to which the membrane is connected. This embodiment thus provides a method for joining a thin membrane to a body by thermal "welding", even though the material of body would be unstable at the used temperatures.

According to another embodiment of the invention, one of the joining partners has a brim at least at one of its edges which is brought into contact with a thermode and pressed against the other joining partner. In this way, for example the housings of pressure transducers can be bonded to each other.

It is understood that the method of the invention can be used in a variety of applications. For example, it can be used for manufacturing lab-on-a-chip devices, wherein capillary structures are produced in a carrier substrate and a foil is attached to the carrier substrate with the method of the invention. The channel structures thus formed in the substrate, which is preferably made of a solvent resistant material, can be used for chemical analysis of fluids in the channels. Furthermore, the method of the invention can be used for joining foils, for example a polyether etherketone (PEEK) foil with another PEEK foil. Also, the method of the invention can be used to connect valve membranes to a corresponding valve housing or valve seat. In accordance with a further aspect of the invention, a membrane can be directly bonded to a housing by a thermal treatment without an intermediate foil when at least one of the two joining partners becomes soft (starts to melt) by the application of heat. Examples of possible materials for the membrane are polyetheretherketone (PEEK) or polytetrafluoroethylene (PTFE), and the material of the housing may comprise PEEK or perfluoro alcoxy (PFA) or fluorinated ethylene propylene (FEP).

BRIEF DESCRIPTION OF THE DRAWINGS

In the following, embodiments of the invention will be explained in detail with reference to the drawings.

DETAILED DESCRIPTION OF THE INVENTION

Figure 1:
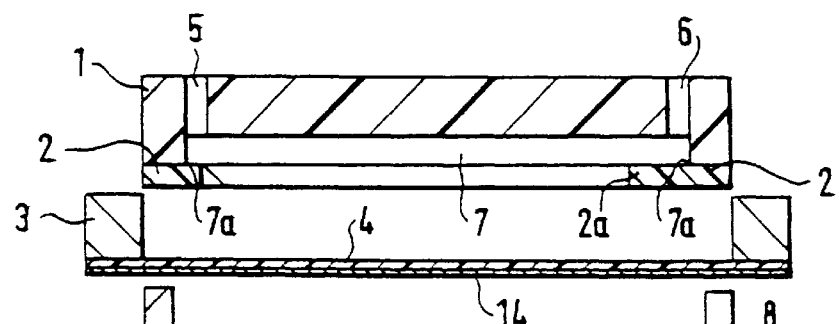
FIG. 1 illustrates a first process step of an embodiment of the invention.

In the following three embodiments of the invention which will be described with reference to FIGS. 1–4, 5, and 6, respectively, the same reference numerals will be used for parts which have the same function, respectively, e.g., the means for applying heat (thermode) to the parts will be designated with the same reference numeral in all embodiments, as well as the foil used for joining the two parts, etc. .

Figure 2:
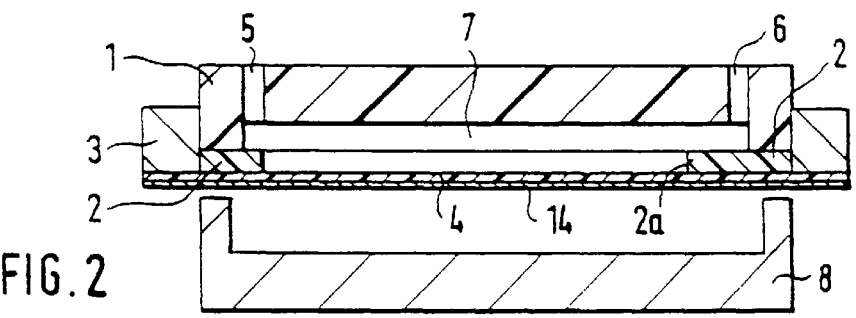
FIG. 2 illustrates a second process step of an embodiment of the invention.

In the first embodiment, the joining of a body with a membrane is described. Such an arrangement is used, for example, for producing degassers for liquid chromatographs. FIGS. 1 and 2 depict various stages of the manufacturing process in schematic cross-sectional views.

According to FIG. 1, a circular body 1 is processed such that a depression 7 and openings for an inlet 5 and an outlet 6 are created. A membrane 4 is stretched over a frame 3. A member 2 is cut from a foil in accordance with the contour of the depression 7 such that the member 2 completely covers the inner edge 7a of the depression 7 and so that at one place 2a a bulge in the form of a tongue is created. The member 2 is placed over the inner edge of the depression 7 so that the bulge 2a is positioned above the opening 6 for the outlet. The creation of the depression 7 and of the openings 5 and 6 is typically performed by using precision machining methods, such as CNC-milling, CNC-turning, or micromachining, or the whole body together with the depression 7 is fabricated in one step by injection molding. For manufacturing the membrane 4, it is preferred to use a method as described in DE 3920788. For example, a silicon wafer with a diameter of 100 mm is covered with a separation layer 14 of gold and a polytetrafluoroethylene (PTFE) layer 4 is spin coated. The frame 3 is adhesively bonded to the PTFE, and the PTFE membrane is mechanically separated from the silicon. The gold layer 14 adheres to the PTFE.

In accordance with an embodiment of the invention, the circular body 1 and the membrane 4 consist of polytetrafluoroethylene (PTFE), and the member 2 consists of fluorinated ethylene propylene (FEP). In a practical example of the invention, the outer diameter of the body 1 is 42 mm, the depression 7 has a depth of 300 micrometers, the membrane has a thickness of 5 micrometers, the inner diameter of the frame 3 is 42 mm, and the thickness of the member 2 is 25 micrometers. In the drawings, not all parts are drawn to scale. In particular, the membrane 4 and the parts 2 or 2a are drawn somewhat thicker than other parts to show them more clearly.

The membrane 4, together with the frame 3, is positioned above the body 1 such that the membrane 4 is located upon the member 2. The frame 3 lies closely at the outer circumference of the body 1. The membrane 4 is then pressed on the member 2 by means of a heating device (thermode) 8 and heated for such a time interval that the member 2 is starting to melt.

When locally heating the FEP member 2, the body 1 and the membrane 4 are also getting warm. However, the small spacing between the frame 3 and the part of the body 1 which was also heated, prevents an expansion of the body 1. If the thermal expansion of the body 1 is not prevented, deformations and distortions in the joined parts, caused by differences in the thermal coefficient of expansion, will result after joining and cooling down.

According to a practical example, in particular when the material of one of the joining partners is PTFE and the member 2 is made of FEP, the temperature during local heating is 352 degrees centigrade.

Figure 3:
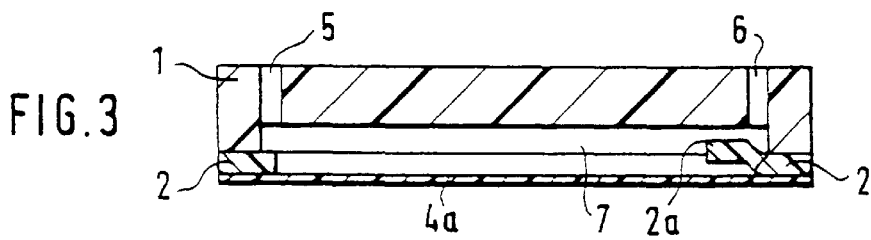
FIG. 3 illustrates the result of the process steps according to FIGS. 1 and 2.

When the FEP part 2 has cooled down, a permanent connection between the membrane 4 and the body 1 results which is provided by the FEP which has solidified again. The membrane 4 is then cut through along the connecting line, and the frame 3 together with the rests of the membrane are removed, such that the depression in the body 1 is sealed by a membrane 4a. The result is shown in FIG. 3. In that way, a stable connection between the body 1 and the membrane 4 is established which is gas-tight. The material of the foil 2 can be selected such that it is chemically resistant against the liquids used, for example solvents typically used in liquid chromatography. The membrane 4 is brought into contact with the body 1 with the side which is distal to the separation layer 14 of gold. The separation layer 14 facilitates the removing of the thermode 8 from the membrane after bonding. After bonding, the separation layer 14 is removed from the membrane by etching in a suitable solution.

According to an embodiment of the invention, the membrane 4 is bonded to the body 1 while the membrane is fixed to a frame 3. Such an arrangement is preferred because a thin membrane tends to bend and to roll up which hampers bonding the membrane 4a stretched on the body 1. If the membrane 4 is thicker than about 100 micrometers, it is possible to bond it to the body 1 without the use of a frame (see FIG. 5). Moreover, the membrane 4 does not need to extend over the entire body 1, but it is possible to bond it to a part of the body, and it is possible to bond the membrane 4 to a part of the body 1 where there is no depression 7.

Figure 6:
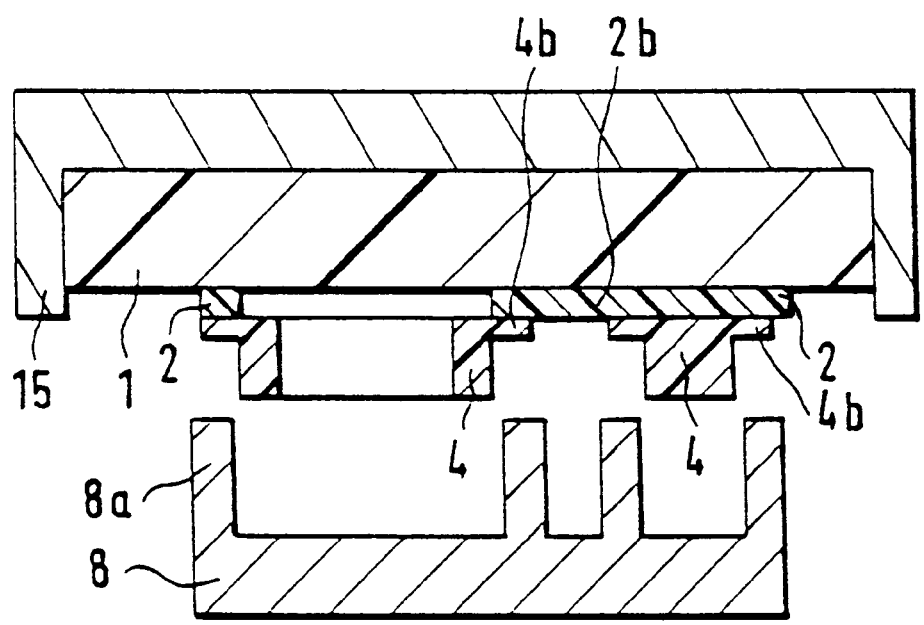
FIG. 6 illustrates a third embodiment of the invention.

FIG. 6 shows how it is possible to bond a second body 4 instead of a membrane to the body 1. The body 4 has a thin brim 4b at which the thermode 8 is pressing the body 4 against the body 1 and where the bonding takes place. The thickness of the brim 4b is in the range of a few micrometers to 1 mm. Preferably, the thickness is less than 100 micrometers.

In an embodiment of the invention, the member 2 is cut according to the shape of the bonding area, but it is also possible to extend the member 2 over that area as shown in FIG. 6 by the example of the part 2b and in FIGS. 1 to 4 by the example of the part 2a.

According to an embodiment of the invention, the thermode 8 is made of copper which is electrically heated. The copper surface of the thermode can be nickel-plated in order to prevent corrosion and adherence of the membrane. Preferably, the temperature of the thermode is optimized such that a stable connection is achieved between the membrane 4 and the body 1, but that the time during which heat is applied is kept small. In that way, a deformation of the body 1 is substantially avoided. The heating time may be, for example, as short as 15 seconds. The parts of the thermode which come into contact with the membrane protrude from the surface of the thermode and have a shape adapted to the portion where the connection actually has to be made.

Figure 5:
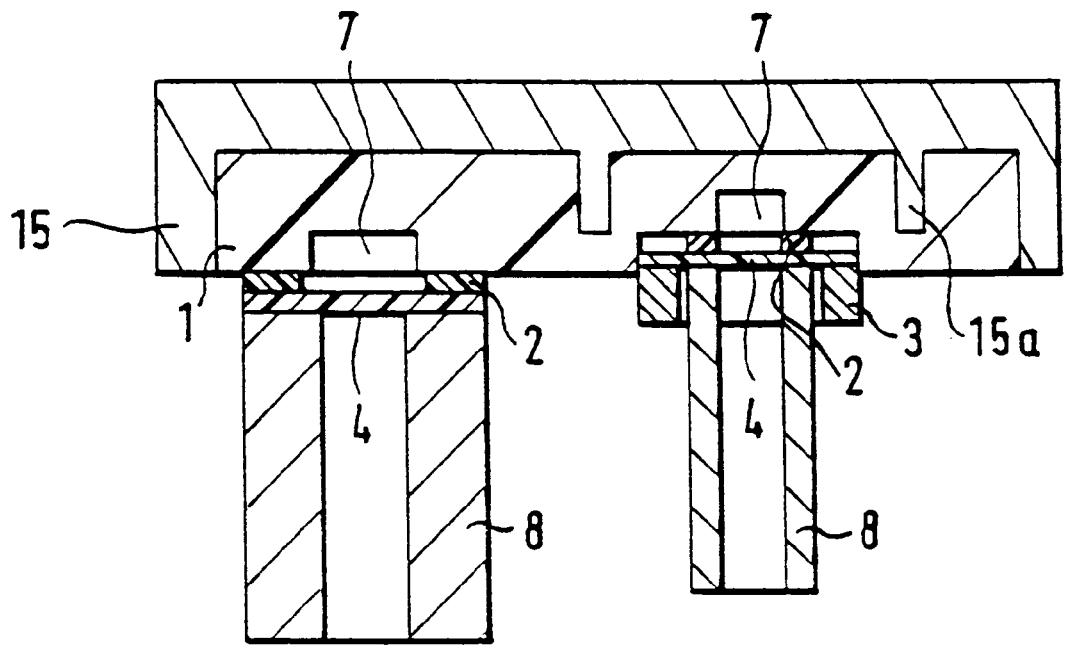
FIG. 5 illustrates a second embodiment of the invention.

It is possible to use a thermode 8 which is hollow, e.g. a hollow cylinder for the bonding of a membrane 4 to a body along a circular path as shown in FIG. 5. As shown in FIG. 6, according to another embodiment of the invention, the parts 8a of the thermode 8 which come into contact with the membrane 4 or the body 1 are designed as a protruding pattern with a shape adapted to the path along which the bonding shall take place. The protruding pattern is preferably produced by milling and drilling or by micromachining of the thermode 8.

FIG. 5 also shows that the body 1 can be hindered from expanding during heating of the member 2 by a holder 15 which is separated from the frame 3 and which can have protruding parts 15a which are inserted into depressions in the body 1.

Figure 4:
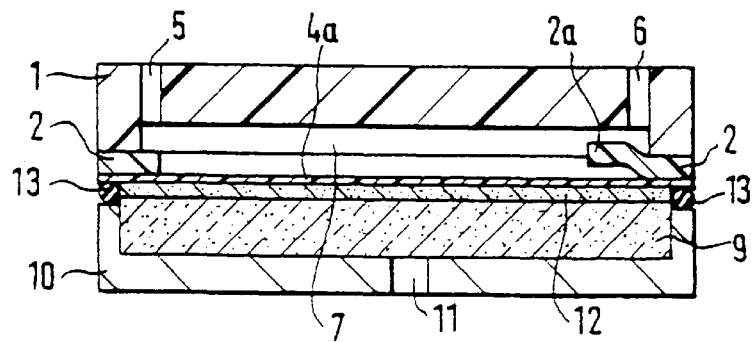
FIG. 4 schematically shows a degasser for a liquid chromatograph manufactured by employing the method of the invention.

FIG. 4 illustrates additional steps for manufacturing the final degasser. On the side of the membrane 4a opposite to the body 1, a piece of a gas-permeable layer 12 and a glass frit 9 acting as a supporting structure are arranged and then mounted using a cover 10. The frit 9 everywhere projects beyond the edge 7a of the depression 7, so that there is no danger that the membrane 4a is damaged at its edge by the frit 9. Without such a measure, the thin membrane (typically 5 micrometers thick) can easily be damaged, because the body 1 which is typically made of PTFE, can easily deform locally and the frit 9 may be pushed through the membrane 4a.

The cover 10 is connected via a seal 13 in a gas-tight manner with the body 1. An opening 11 is provided to which a vacuum pump (not shown) can be connected for evacuating the volume within the cover to a residual pressure of about 100 hPa. Due to the underpressure within the space formed by the cover 10 and the membrane 4a, the membrane 4a is sucked against the frit 9. The gas-permeable layer 12 prevents that the thin membrane 4a is damaged by the pores of the frit 9.

For using the degasser of the invention in connection with a liquid chromatograph, the inlet 5 is connected to a solvent supply and the outlet 6 is connected to the high pressure pump of the chromatograph.

When the vacuum pump connected to the opening 11 is switched off and the space formed by the cover 10 and the membrane 4a is ventilated with air, while the liquid chromatograph pump continues pumping e.g. methanol through the space 7, an underpressure is created relative to the space formed by the cover 10 and the membrane 4a. This underpressure sucks the membrane 4a in the direction of the outlet 6 and would lead to damage of the membrane 4a, if the bulge 2a of the FEP member 2 would not also be sucked to the outlet 6 and close the outlet. In that way, it is avoided that a greater pressure difference across the membrane 4a is created which would otherwise lead to damage of the membrane.

It is even more likely that an underpressure in the space 7 will be generated when the chromatograph including the vacuum pump is switched off and the solvent supply is stored at a lower level than the degasser. In this case, the bulge 2a at the inlet of the degasser will prevent the membrane 4a to be damaged by the underpressure.

It is possible to use other materials than those mentioned above for the parts to be joined 1 and 4, respectively, and the member 2. The materials are chosen such that an adhesion is achieved after the bonding process described here. For example, the member 2 can be made of another fluorinated material which becomes soft under temperature increase, such as perfluoro alcoxy (PFA), or the body 1 and the membrane 4 can be made of FEP or PFA.

What is claimed is:

1. A method for joining two or more solid parts, comprising:
    providing a foil between the two or more parts;
    heating said foil to an elevated temperature such that it becomes soft;
    providing a cooling step for cooling down the foil below said elevated temperature;
    wherein the foil is cut in such a way that it comprises a tongue projecting into a cavity of at least one of said two or more parts and being suitable for closing an outlet of said cavity.

2. Method as in claim 1, wherein at least one of the two or more parts is a membrane.

3. Method as in claim 2, wherein the membrane has a thickness of less than about 10 micrometers.

4. Method as in claim 2, wherein the membrane is made of a fluorinated synthetic material.

5. Method as in claim 2, wherein the membrane is freely stretched across a frame and, prior to heating said foil, said membrane is pressed on the foil together with said one or more parts by means of a thermode, and wherein the thermode provides the heat for heating said foil.

6. Method as in claim 5, wherein the thermode is shaped according to a desired joining area between the two solid parts.

7. Method as in claim 5, wherein one or more of said parts is covered with a separation layer.

8. Method as in claim 5, wherein at least one of said parts is prevented from thermal expansion during the heating of the foil by providing a framing member therearound wherein said framing member is the frame across which the membrane is stretched.

9. Method as in claim 1, wherein, the foil is shaped according to a desired joining area between the two or more solid parts.

10. Method as in claim 1, wherein heating said foil comprises heating of the two parts only locally.

11. Method as in claim 1, wherein the foil has a thickness of less than about 25 micrometers.

12. Method as in claim 1, wherein the foil is made of a fluorinated material.

* * * * *